United States Patent
Ben Baruch et al.

(10) Patent No.: US 12,159,412 B2
(45) Date of Patent: Dec. 3, 2024

(54) INTERACTIVELY DEFINING AN OBJECT SEGMENTATION

(71) Applicant: Snap Inc., Santa Monica, CA (US)

(72) Inventors: Shani Ben Baruch, Tel Aviv (IL); Ma'ayan Mishin Shuvi, Tel Aviv (IL); Gal Dudovitch, Tel Aviv (IL); Avihay Assouline, Tel Aviv (IL); Itamar Berger, Hod Hasharon (IL); Gal Sasson, Kibbutz Ayyelet Hashahar (IL)

(73) Assignee: Snap Inc., Santa Monica, CA (US)

( * ) Notice: Subject to any disclaimer, the term of this patent is extended or adjusted under 35 U.S.C. 154(b) by 209 days.

(21) Appl. No.: 17/650,918

(22) Filed: Feb. 14, 2022

(65) Prior Publication Data

US 2023/0260127 A1 Aug. 17, 2023

(51) Int. Cl.
*G06T 7/11* (2017.01)
*G06T 5/77* (2024.01)
*G06T 11/00* (2006.01)

(52) U.S. Cl.
CPC .................. *G06T 7/11* (2017.01); *G06T 5/77* (2024.01); *G06T 11/00* (2013.01);
(Continued)

(58) Field of Classification Search
CPC . G06T 7/11; G06T 5/005; G06T 11/00; G06T 2207/10016; G06T 2207/20081;
(Continued)

(56) References Cited

U.S. PATENT DOCUMENTS 6,026,182 A 2/2000 Lee et al.
6,662,230 B1 12/2003 Eichstaedt et al.
(Continued)

FOREIGN PATENT DOCUMENTS

CN 103049761 8/2016
CN 107251006 10/2017
(Continued)

OTHER PUBLICATIONS

"U.S. Appl. No. 17/660,965, Non Final Office Action mailed Dec. 21, 2022", 20 pgs.
(Continued)

*Primary Examiner* — Tapas Mazumder
(74) *Attorney, Agent, or Firm* — Schwegman Lundberg & Woessner, P.A.

(57) ABSTRACT

Methods and systems are disclosed for performing operations for segmenting an object. The operations include receiving an image that includes a depiction of a first object; receiving a first segmentation dataset; applying a first machine learning technique to the first segmentation dataset and the image to estimate a first segmentation of the first object depicted in the image; generating a second segmentation dataset that includes the estimated first segmentation and a correction to the estimated first segmentation of the first object; applying the first machine learning technique to the second segmentation dataset and the image to estimate a second segmentation of the first object depicted in the image; and applying an augmented reality experience to the image based on the estimated second segmentation of the first object.

20 Claims, 11 Drawing Sheets

(52) U.S. Cl.
CPC ............... *G06T 2207/10016* (2013.01); *G06T 2207/20081* (2013.01); *G06T 2207/20092* (2013.01); *G06T 2207/20132* (2013.01)

(58) Field of Classification Search
CPC . G06T 2207/20092; G06T 2207/20132; G06T 2200/24; G06T 2207/20084; G06T 2207/20101; G06T 5/50; G06T 7/143; G06T 7/174; G06T 7/194
See application file for complete search history.

(56) References Cited

U.S. PATENT DOCUMENTS

| | | | |
|---|---|---|---|
| 6,707,851 B1 | 3/2004 | Choi et al. |
| 6,720,860 B1 | 4/2004 | Narayanaswami |
| 6,728,314 B2 | 4/2004 | Kan et al. |
| 6,745,286 B2 | 6/2004 | Staub et al. |
| 6,748,425 B1 | 6/2004 | Duffy et al. |
| 6,832,222 B1 | 12/2004 | Zimowski |
| 6,862,692 B2 | 3/2005 | Ulrich et al. |
| 6,990,547 B2 | 1/2006 | Ulrich et al. |
| 6,990,667 B2 | 1/2006 | Ulrich et al. |
| 7,054,927 B2 | 5/2006 | Ulrich et al. |
| 7,237,002 B1 | 6/2007 | Estrada et al. |
| 7,240,089 B2 | 7/2007 | Boudreau |
| 7,624,160 B2 | 11/2009 | Henderson et al. |
| 7,904,459 B2 | 3/2011 | Grigsby et al. |
| 7,971,156 B2 | 6/2011 | Albertson et al. |
| 7,996,793 B2 | 8/2011 | Latta et al. |
| 8,010,615 B2 | 8/2011 | Jimenez et al. |
| 8,032,602 B2 | 10/2011 | Lavoie et al. |
| 8,036,950 B1 | 10/2011 | Schneur et al. |
| 8,037,453 B1 | 10/2011 | Zawadzki |
| 8,195,748 B2 | 6/2012 | Hallyn |
| 8,219,628 B2 | 7/2012 | DeLuca |
| 8,285,795 B2 | 10/2012 | O'Sullivan et al. |
| 8,312,089 B2 | 11/2012 | Deluca et al. |
| 8,384,740 B1 | 2/2013 | Ruzon et al. |
| 8,392,516 B2 | 3/2013 | Deluca et al. |
| 8,458,269 B2 | 6/2013 | Friedman et al. |
| 8,473,555 B2 | 6/2013 | Lai |
| 8,487,938 B2 | 7/2013 | Latta et al. |
| 8,515,732 B2 | 8/2013 | Liu et al. |
| 8,521,825 B2 | 8/2013 | Jang |
| 8,521,882 B2 | 8/2013 | Amsterdam et al. |
| 8,601,080 B2 | 12/2013 | O'Sullivan et al. |
| 8,635,299 B2 | 1/2014 | Bhogal et al. |
| 8,825,778 B2 | 9/2014 | Deluca |
| 8,856,691 B2 | 10/2014 | Geisner et al. |
| 8,862,519 B2 | 10/2014 | O'Sullivan et al. |
| 8,874,675 B2 | 10/2014 | Chakra et al. |
| 8,914,368 B2 | 12/2014 | Badenes et al. |
| 8,943,147 B2 | 1/2015 | Baartman et al. |
| 8,984,120 B2 | 3/2015 | Saxena et al. |
| 8,990,327 B2 | 3/2015 | Drews et al. |
| 9,054,898 B2 | 6/2015 | Dreyfus et al. |
| 9,055,018 B2 | 6/2015 | Corrao |
| 9,207,852 B1 | 12/2015 | Zhou et al. |
| 9,225,897 B1 | 12/2015 | Sehn et al. |
| 9,230,160 B1 | 1/2016 | Kanter |
| 9,276,886 B1 | 3/2016 | Samaranayake |
| 9,608,949 B2 | 3/2017 | Skyrm et al. |
| 9,705,831 B2 | 7/2017 | Spiegel |
| 9,742,713 B2 | 8/2017 | Spiegel et al. |
| 9,811,923 B2 | 11/2017 | Wang et al. |
| 9,854,219 B2 | 12/2017 | Sehn |
| 9,882,954 B2 | 1/2018 | Burckart et al. |
| 9,936,022 B2 | 4/2018 | Chen et al. |
| 10,074,381 B1 | 9/2018 | Cowburn |
| 10,102,423 B2 | 10/2018 | Shaburov et al. |
| 10,102,447 B1 | 10/2018 | Gusarov |
| 10,102,634 B1 | 10/2018 | Poliakov |
| 10,123,166 B2 | 11/2018 | Zimerman et al. |
| 10,168,879 B1 | 1/2019 | Duan et al. |
| 10,198,626 B2 | 2/2019 | Li et al. |
| 10,198,671 B1 | 2/2019 | Yang et al. |
| 10,204,137 B2 | 2/2019 | Shim et al. |
| 10,284,508 B1 | 5/2019 | Allen et al. |
| 10,324,942 B2 | 6/2019 | Yang et al. |
| 10,334,307 B2 | 6/2019 | Hogeg et al. |
| 10,423,237 B2 | 9/2019 | Episkopos et al. |
| 10,423,983 B2 | 9/2019 | Shim et al. |
| 10,430,838 B1 | 10/2019 | Andreou |
| 10,439,972 B1 | 10/2019 | Spiegel et al. |
| 10,491,554 B1 | 11/2019 | Hammer et al. |
| 10,509,466 B1 | 12/2019 | Miller et al. |
| 10,514,876 B2 | 12/2019 | Sehn |
| 10,515,480 B1 | 12/2019 | Hare et al. |
| 10,579,869 B1 | 3/2020 | Xiong et al. |
| 10,592,839 B2 | 3/2020 | Behringer et al. |
| 10,609,324 B2 | 3/2020 | Monastyrshyn et al. |
| 10,614,855 B2 | 4/2020 | Huang |
| 10,616,162 B1 | 4/2020 | Zhao |
| 10,623,666 B2 | 4/2020 | Charlton et al. |
| 10,679,428 B1 | 6/2020 | Chen et al. |
| 10,713,754 B1 | 7/2020 | Wang et al. |
| 10,733,255 B1 | 8/2020 | Yang et al. |
| 10,740,974 B1 | 8/2020 | Cowburn et al. |
| 10,748,347 B1 | 8/2020 | Li et al. |
| 10,749,925 B1 | 8/2020 | Hudgin et al. |
| 10,768,639 B1 | 9/2020 | Meisenholder et al. |
| 10,776,981 B1 | 9/2020 | Gorbatyuk et al. |
| 10,776,993 B1 | 9/2020 | Chen et al. |
| 10,789,453 B2 | 9/2020 | Savchenkov et al. |
| 10,803,342 B1 | 10/2020 | Gusarov |
| 10,817,156 B1 | 10/2020 | Samaranayake |
| 10,817,898 B2 | 10/2020 | Waldron et al. |
| 10,818,308 B1 | 10/2020 | Chu |
| 10,839,007 B1 | 11/2020 | Chen et al. |
| 10,872,292 B1 | 12/2020 | Yang et al. |
| 10,877,568 B2 | 12/2020 | Huang et al. |
| 10,885,136 B1 | 1/2021 | Jahangiri |
| 10,891,797 B1 | 1/2021 | Poliakov et al. |
| 10,911,575 B1 | 2/2021 | Pavlovskaia et al. |
| 10,958,608 B1 | 3/2021 | Allen et al. |
| 10,962,809 B1 | 3/2021 | Castañeda |
| 10,965,888 B1 | 3/2021 | Boyd et al. |
| 10,996,846 B2 | 5/2021 | Robertson et al. |
| 10,997,787 B2 | 5/2021 | Ge et al. |
| 11,003,997 B1 | 5/2021 | Blackwood et al. |
| 11,005,789 B1 | 5/2021 | Chung et al. |
| 11,012,390 B1 | 5/2021 | Al Majid et al. |
| 11,030,454 B1 | 6/2021 | Xiong et al. |
| 11,030,753 B2 | 6/2021 | Kudriashov et al. |
| 11,036,368 B1 | 6/2021 | Al Majid et al. |
| 11,062,498 B1 | 7/2021 | Voss et al. |
| 11,070,510 B1 | 7/2021 | Hollis et al. |
| 11,081,141 B2 | 8/2021 | Li et al. |
| 11,087,513 B1 | 8/2021 | Duan et al. |
| 11,087,728 B1 | 8/2021 | Canberk et al. |
| 11,089,238 B2 | 8/2021 | Shaburov et al. |
| 11,092,998 B1 | 8/2021 | Castañeda et al. |
| 11,099,643 B1 | 8/2021 | Miller et al. |
| 11,106,342 B1 | 8/2021 | Al Majid et al. |
| 11,113,797 B1 | 9/2021 | Al Majid et al. |
| 11,122,200 B2 | 9/2021 | Sehn |
| 11,126,206 B2 | 9/2021 | Meisenholder et al. |
| 11,126,266 B1 | 9/2021 | Xiao et al. |
| 11,132,763 B2 | 9/2021 | Katz et al. |
| 11,143,867 B2 | 10/2021 | Rodriguez, II |
| 11,151,756 B2 | 10/2021 | Ma et al. |
| 11,157,076 B1 | 10/2021 | Tham |
| 11,157,557 B2 | 10/2021 | Mashrabov et al. |
| 11,157,725 B2 | 10/2021 | Andersen et al. |
| 11,158,351 B1 | 10/2021 | Ren et al. |
| 11,159,743 B2 | 10/2021 | Li et al. |
| 11,169,600 B1 | 11/2021 | Canberk et al. |
| 11,175,516 B1 | 11/2021 | Canberk et al. |
| 11,178,089 B1 | 11/2021 | Voss |
| 11,178,375 B1 | 11/2021 | Katz et al. |
| 11,182,603 B1 | 11/2021 | Li et al. |
| 11,189,104 B2 | 11/2021 | Goodrich et al. |
| 11,210,467 B1 | 12/2021 | Carvalho et al. |
| 11,212,383 B2 | 12/2021 | Voss et al. |

(56) References Cited

U.S. PATENT DOCUMENTS

| | | |
|---|---|---|
| 11,212,482 B2 | 12/2021 | Monastyrshyn et al. |
| 11,216,949 B1 | 1/2022 | Poliakov |
| 11,217,020 B2 | 1/2022 | Goodrich et al. |
| 11,227,626 B1 | 1/2022 | Krishnan Gorumkonda et al. |
| 11,307,747 B2 | 4/2022 | Dancie et al. |
| 11,308,266 B1 | 4/2022 | Estrada Diaz |
| 11,531,402 B1 | 12/2022 | Stolzenberg |
| 11,546,505 B2 | 1/2023 | Canberk |
| 2002/0124137 A1 | 9/2002 | Ulrich et al. |
| 2002/0138559 A1 | 9/2002 | Ulrich et al. |
| 2002/0169827 A1 | 11/2002 | Ulrich et al. |
| 2002/0191311 A1 | 12/2002 | Ulrich et al. |
| 2004/0140994 A1 | 7/2004 | Choi et al. |
| 2006/0064411 A1 | 3/2006 | Gross et al. |
| 2009/0012788 A1 | 1/2009 | Gilbert et al. |
| 2010/0050133 A1 | 2/2010 | Nishihara et al. |
| 2010/0169426 A1 | 7/2010 | Dreyfus et al. |
| 2010/0169438 A1 | 7/2010 | Denner et al. |
| 2010/0174786 A1 | 7/2010 | Chalemin et al. |
| 2010/0293239 A1 | 11/2010 | Cross et al. |
| 2011/0167117 A1 | 7/2011 | Hart et al. |
| 2011/0258537 A1 | 10/2011 | Rives et al. |
| 2011/0274311 A1 | 11/2011 | Lee et al. |
| 2011/0301934 A1 | 12/2011 | Tardif |
| 2012/0005277 A1 | 1/2012 | Osullivan et al. |
| 2012/0117161 A1 | 5/2012 | Best et al. |
| 2012/0143964 A1 | 6/2012 | Deluca et al. |
| 2012/0239767 A1 | 9/2012 | Deluca |
| 2013/0051614 A1 | 2/2013 | Lee et al. |
| 2014/0092005 A1 | 4/2014 | Anderson et al. |
| 2014/0171036 A1 | 6/2014 | Simmons |
| 2015/0120293 A1 | 4/2015 | Wohlert et al. |
| 2015/0356102 A1 | 12/2015 | Cohen et al. |
| 2015/0356191 A1 | 12/2015 | Rotem et al. |
| 2015/0370320 A1 | 12/2015 | Connor |
| 2016/0014063 A1 | 1/2016 | Hogeg et al. |
| 2016/0048869 A1 | 2/2016 | Shim et al. |
| 2016/0328360 A1 | 11/2016 | Pavlovskaia et al. |
| 2017/0123487 A1 | 5/2017 | Hazra et al. |
| 2017/0220856 A1 | 8/2017 | Mohandes et al. |
| 2017/0277684 A1 | 9/2017 | Dharmarajan Mary |
| 2017/0277685 A1 | 9/2017 | Takumi |
| 2017/0286752 A1 | 10/2017 | Gusarov et al. |
| 2017/0289234 A1 | 10/2017 | Andreou et al. |
| 2017/0332205 A1 | 11/2017 | Shim et al. |
| 2017/0351910 A1 | 12/2017 | Elwazer et al. |
| 2018/0048859 A1 | 2/2018 | Episkopos et al. |
| 2018/0075659 A1 | 3/2018 | Browy et al. |
| 2018/0114366 A1 | 4/2018 | Ivers et al. |
| 2018/0121762 A1 | 5/2018 | Han et al. |
| 2018/0158370 A1 | 6/2018 | Pryor |
| 2019/0073525 A1 | 3/2019 | Kim et al. |
| 2019/0164197 A1 | 5/2019 | Boyd et al. |
| 2019/0237106 A1 | 8/2019 | Sehn |
| 2019/0287287 A1 | 9/2019 | Bondich et al. |
| 2019/0339837 A1 | 11/2019 | Furtwangler |
| 2019/0340426 A1 | 11/2019 | Rangarajan et al. |
| 2020/0099912 A1 | 3/2020 | Katz |
| 2020/0167995 A1 | 5/2020 | Hare et al. |
| 2020/0186489 A1 | 6/2020 | Chen et al. |
| 2020/0234480 A1 | 7/2020 | Volkov et al. |
| 2020/0234508 A1 | 7/2020 | Shaburov et al. |
| 2020/0234690 A1 | 7/2020 | Savchenkov et al. |
| 2020/0258189 A1 | 8/2020 | Chen et al. |
| 2020/0314326 A1 | 10/2020 | Rodriguez, II et al. |
| 2020/0320748 A1* | 10/2020 | Levinshtein ......... G06V 10/454 |
| 2020/0336678 A1 | 10/2020 | Ma et al. |
| 2020/0371682 A1 | 11/2020 | Brody et al. |
| 2020/0387214 A1 | 12/2020 | Ravasz et al. |
| 2020/0388064 A1 | 12/2020 | Nemchinov et al. |
| 2020/0412864 A1 | 12/2020 | Al Majid et al. |
| 2020/0412975 A1 | 12/2020 | Al Majid et al. |
| 2021/0011612 A1 | 1/2021 | Dancie et al. |
| 2021/0027100 A1 | 1/2021 | Bogdanovych et al. |
| 2021/0037179 A1 | 2/2021 | Luo et al. |
| 2021/0055835 A1 | 2/2021 | Andreou |
| 2021/0065448 A1 | 3/2021 | Goodrich et al. |
| 2021/0065464 A1 | 3/2021 | Goodrich et al. |
| 2021/0067756 A1 | 3/2021 | Goodrich et al. |
| 2021/0073572 A1 | 3/2021 | Cowburn et al. |
| 2021/0074016 A1 | 3/2021 | Li et al. |
| 2021/0074069 A1 | 3/2021 | Charlton et al. |
| 2021/0097105 A1 | 4/2021 | Al Majid et al. |
| 2021/0097245 A1 | 4/2021 | Monroy-Hernández |
| 2021/0097743 A1 | 4/2021 | Krishnan Gorumkonda et al. |
| 2021/0097744 A1 | 4/2021 | Gorumkonda et al. |
| 2021/0097746 A1 | 4/2021 | Krishnan Gorumkonda et al. |
| 2021/0099405 A1 | 4/2021 | Al Majid et al. |
| 2021/0099406 A1 | 4/2021 | Al Majid et al. |
| 2021/0099407 A1 | 4/2021 | Al Majid et al. |
| 2021/0099408 A1 | 4/2021 | Al Majid et al. |
| 2021/0099551 A1 | 4/2021 | Cieslak et al. |
| 2021/0099639 A1 | 4/2021 | Bartow et al. |
| 2021/0103779 A1 | 4/2021 | Brody |
| 2021/0165559 A1 | 6/2021 | Voss et al. |
| 2021/0165998 A1 | 6/2021 | Cao et al. |
| 2021/0166732 A1 | 6/2021 | Shaburova et al. |
| 2021/0174034 A1 | 6/2021 | Retek et al. |
| 2021/0183033 A1 | 6/2021 | Chung et al. |
| 2021/0192744 A1 | 6/2021 | Vij et al. |
| 2021/0216776 A1 | 7/2021 | Hare et al. |
| 2021/0224050 A1 | 7/2021 | Wang et al. |
| 2021/0224086 A1 | 7/2021 | Jensen et al. |
| 2021/0240331 A1 | 8/2021 | Olson et al. |
| 2021/0241529 A1 | 8/2021 | Cowburn et al. |
| 2021/0243487 A1 | 8/2021 | Kotsopoulos et al. |
| 2021/0271533 A1 | 9/2021 | Varbedian et al. |
| 2021/0272600 A1 | 9/2021 | Boyd et al. |
| 2021/0279842 A1 | 9/2021 | Anilkumar et al. |
| 2021/0280218 A1 | 9/2021 | Paliwoda |
| 2021/0299581 A1 | 9/2021 | Wu et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0304469 A1 | 9/2021 | Heikkinen et al. |
| 2021/0306451 A1 | 9/2021 | Heikkinen et al. |
| 2021/0311618 A1 | 10/2021 | Barton et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0312682 A1 | 10/2021 | Krishnan Gorumkonda et al. |
| 2021/0319540 A1 | 10/2021 | Cao et al. |
| 2021/0319625 A1 | 10/2021 | Goodrich et al. |
| 2021/0342384 A1 | 11/2021 | Baril et al. |
| 2021/0368039 A1 | 11/2021 | Voss et al. |
| 2021/0373843 A1 | 12/2021 | Hornsby et al. |
| 2021/0382564 A1 | 12/2021 | Blachly et al. |
| 2021/0382605 A1 | 12/2021 | Edwards et al. |
| 2021/0385470 A1 | 12/2021 | Liu et al. |
| 2021/0390729 A1 | 12/2021 | Fox-roberts et al. |
| 2021/0390745 A1 | 12/2021 | Rykhliuk et al. |
| 2021/0397000 A1 | 12/2021 | Rodriguez, II |
| 2021/0405747 A1 | 12/2021 | Tham |
| 2021/0405761 A1 | 12/2021 | Canberk |
| 2021/0407178 A1 | 12/2021 | Zhou et al. |
| 2021/0407533 A1 | 12/2021 | Cowburn et al. |
| 2021/0407548 A1 | 12/2021 | Ren et al. |
| 2021/0409356 A1 | 12/2021 | Luo et al. |
| 2022/0004260 A1 | 1/2022 | Xiao et al. |
| 2022/0004575 A1 | 1/2022 | Mashrabov et al. |
| 2022/0121344 A1 | 4/2022 | Pastrana Vicente et al. |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2022/0383504 A1* | 12/2022 | Nordstrom ................ G06T 7/10 |
| 2022/0392584 A1* | 12/2022 | Hanaoka ................ G06F 30/10 |

(56) References Cited

U.S. PATENT DOCUMENTS

FOREIGN PATENT DOCUMENTS

| | | | | |
|---|---|---|---|---|
| CN | 109247071 | 1/2019 | | |
| CN | 109416804 | 3/2019 | | |
| CN | 109416805 | 3/2019 | | |
| CN | 109716781 | 5/2019 | | |
| CN | 110168478 | 8/2019 | | |
| CN | 110168586 | 8/2019 | | |
| CN | 110268437 | 9/2019 | | |
| CN | 110462616 | 11/2019 | | |
| CN | 110800012 | 2/2020 | | |
| CN | 110832538 | 2/2020 | | |
| CN | 112789578 | 5/2021 | | |
| EP | 3707693 | 9/2020 | | |
| EP | 3782124 | 2/2021 | | |
| EP | 3899865 | 10/2021 | | |
| EP | 3912092 | 11/2021 | | |
| EP | 3912138 | 11/2021 | | |
| IL | 283319 | 7/2021 | | |
| KR | 20190025659 | 3/2019 | | |
| KR | 20190088503 | 7/2019 | | |
| KR | 20200094801 | 8/2020 | | |
| KR | 20210046760 | 4/2021 | | |
| KR | 20210086665 | 7/2021 | | |
| KR | 20210116652 | 9/2021 | | |
| KR | 20220158824 | 12/2022 | | |
| WO | 02061737 | 8/2002 | | |
| WO | 2016168591 | 10/2016 | | |
| WO | 2017142654 | 8/2017 | | |
| WO | 2018170512 | 9/2018 | | |
| WO | WO-2018170512 A1 * | 9/2018 | ....... | G06F 16/24568 |
| WO | 2019079895 | 5/2019 | | |
| WO | 2019094618 | 5/2019 | | |
| WO | 2019222493 | 11/2019 | | |
| WO | 2020150688 | 7/2020 | | |
| WO | 2020150690 | 7/2020 | | |
| WO | 2020150692 | 7/2020 | | |
| WO | 2020205435 | 10/2020 | | |
| WO | 2021042134 | 3/2021 | | |
| WO | 2021061326 | 4/2021 | | |
| WO | 2021062438 | 4/2021 | | |
| WO | 2021067988 | 4/2021 | | |
| WO | 2021102464 | 5/2021 | | |
| WO | 2021154998 | 8/2021 | | |
| WO | 2021155249 | 8/2021 | | |
| WO | 2021155394 | 8/2021 | | |
| WO | 2021189068 | 9/2021 | | |
| WO | WO-2021194361 A1 * | 9/2021 | ............... | G06T 3/40 |
| WO | 2021202043 | 10/2021 | | |
| WO | 2021203118 | 10/2021 | | |
| WO | 2021242686 | 12/2021 | | |
| WO | 2021252201 | 12/2021 | | |
| WO | 2021252386 | 12/2021 | | |
| WO | 2022005687 | 1/2022 | | |
| WO | 2022005693 | 1/2022 | | |
| WO | 2022005717 | 1/2022 | | |
| WO | 2022006138 | 1/2022 | | |
| WO | 2022060549 | 3/2022 | | |
| WO | 2022066578 | 3/2022 | | |
| WO | 2022132381 | 6/2022 | | |
| WO | 2022146678 | 7/2022 | | |
| WO | 2022198182 | 9/2022 | | |
| WO | 2022216784 | 10/2022 | | |
| WO | 2022225761 | 10/2022 | | |
| WO | 2022245765 | 11/2022 | | |
| WO | 2023154544 | 8/2023 | | |

OTHER PUBLICATIONS

"U.S. Appl. No. 17/660,965, Response filed Mar. 21, 2023 to Non Final Office Action mailed Dec. 21, 2022", 13 pgs.

"U.S. Appl. No. 17/660,965, Final Office Action mailed Jun. 13, 2023", 22 pgs.

"International Application Serial No. PCT/US2023/012994, International Search Report mailed Jul. 13, 2023", 5 pgs.

"International Application Serial No. PCT/US2023/012994, Written Opinion mailed Jul. 13, 2023", 8 pgs.

"International Application Serial No. PCT/US2023/066284, International Search Report mailed Jul. 24, 2023", 4 pgs.

"International Application Serial No. PCT/US2023/066284, Written Opinion mailed Jul. 24, 2023", 6 pgs.

Khalid, Muhammad Usman, "Deep Workpiece Region Segmentation for Bin Picking", IEEE 15th International Conference on Automation Science and Engineering (CASE), IEEE, (Aug. 22, 2019), 7 pgs.

* cited by examiner

INTERACTIVELY DEFINING AN OBJECT SEGMENTATION

TECHNICAL FIELD

The present disclosure relates generally to providing augmented reality experiences using a messaging application.

BACKGROUND

Augmented Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
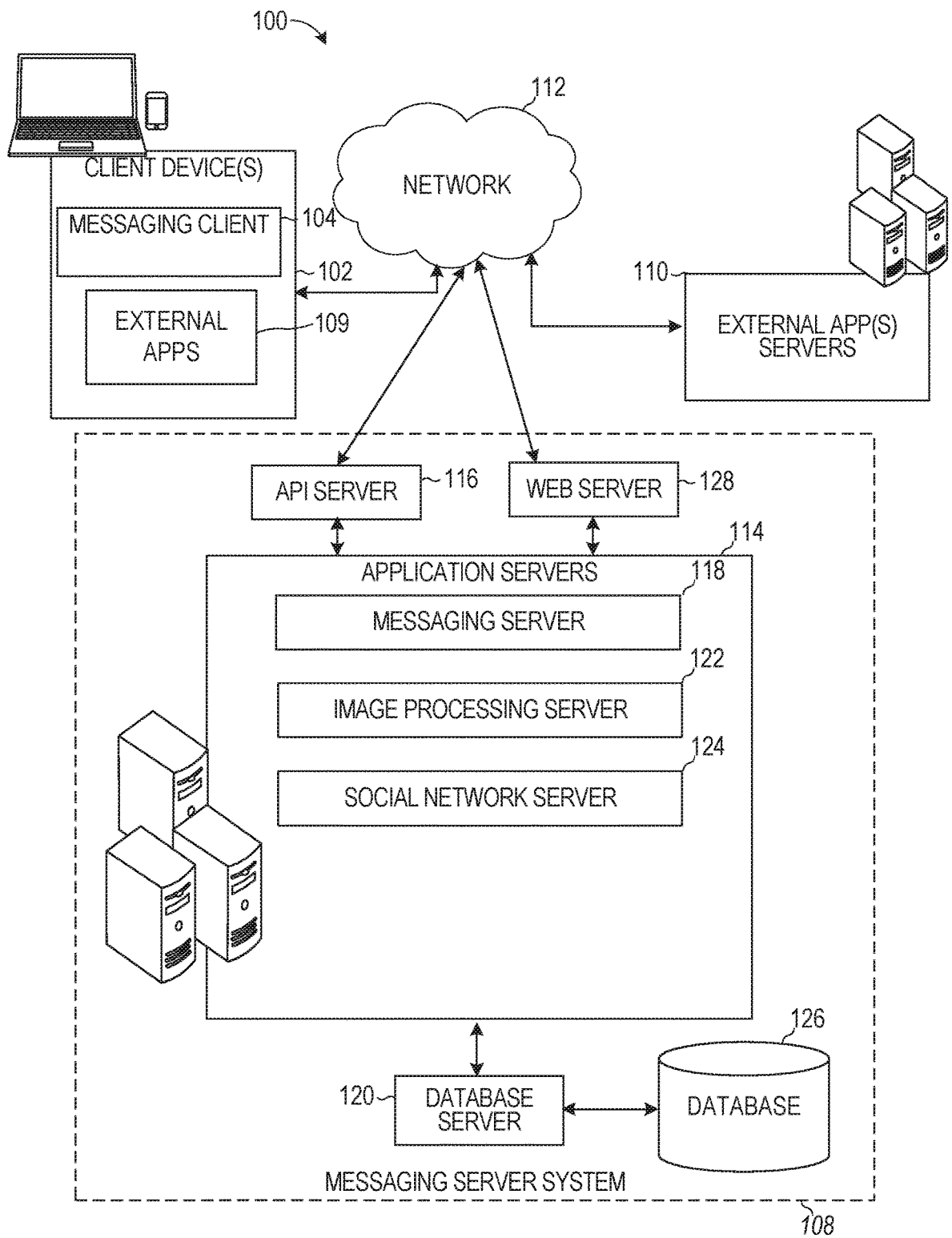
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Segmentation in computer vision refers to the process by which an object is separated from its background by designating a mask for each frame or image. By doing so, various effects can be applied to the foreground and/or background separately. Object segmentation is typically performed by defining what type of foreground will be masked, labeling this type of object in a dataset, and then training a neural network based on that labeling. In this way, the neural network is able to segment only the particular class of objects on which it is trained and the segmented area cannot be controlled by the user or be accurately applied to never before seen objects. Because such systems are generally incapable of segmenting never before seen objects in an image, these systems are also unable to apply visual effects to such objects, which limits their overall use and capabilities.

Some systems allow users to generate custom segmentations of objects through a manual process. This masking action is tedious and requires high accuracy, especially when it comes to object edges. Performing such segmentations on videos is even more tedious as the segmentation needs to be drawn and performed on a frame-by-frame basis. Such processes are incredibly time consuming, which detracts from their overall use and wastes system resources.

The disclosed techniques improve the efficiency of using the electronic device by interactively controlling a segmentation of an object depicted in an image or video. Specifically, the disclosed techniques generate an initial segmentation of an object using a segmentation network (e.g., a neural network). The disclosed techniques present the segmentation to a user and receive input from the user that specifies positive corrections (e.g., the positive correction can be a positive mouse click or positive touch input) and/or negative corrections (e.g., the negative correction can be a negative mouse click or negative touch input). The positive corrections represent a first portion of the image that includes the depiction of the object and the negative corrections represent a second portion of the image that excludes the depiction of the object. The positive and/or negative corrections are used to generate segmentation data, which is used by the segmentation network to update or generate a new segmentation for the object. When the segmentation of the object satisfies a criterion (e.g., when more than a threshold percentage of the object is represented by the segmentation or when no further positive/negative corrections are received from the user), the segmentation is used to track the object using a propagation network (e.g., another neural network). The segmentation of the object can be used to apply one or more visual effects to the image or video, such as removing a depiction of the object from the image, modifying a visual attribute of the object, creating a virtual element or sticker that includes a cropped portion of the image depicting the object, and/or generating a bounding box for the object.

In some examples, the disclosed techniques receive an image that includes a depiction of a first object and receive a first segmentation dataset. The disclosed techniques apply a first machine learning technique to the first segmentation dataset and the image to estimate a first segmentation of the first object depicted in the image. The disclosed techniques generate a second segmentation dataset that includes the estimated first segmentation and a correction to the estimated first segmentation of the first object. The disclosed techniques apply the first machine learning technique to the second segmentation dataset and the image to estimate a second segmentation of the first object depicted in the image. The disclosed techniques apply an AR experience to the image based on the estimated second segmentation of the first object. In some examples, the disclosed techniques apply the estimated second segmentation to a video, such as a subsequently received frame of the video and predict or estimate a third segmentation of the first object depicted in the subsequently received frame. In this way, the disclosed techniques can generate an initial segmentation and continuously update and refine the segmentation for one or more objects depicted in a video. Using the refined segmentation, the disclosed techniques can provide an AR experience for modifying one or more objects depicted in a video. This improves the overall experience of the user in using the electronic device. Also, by performing such segmentations without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104, As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
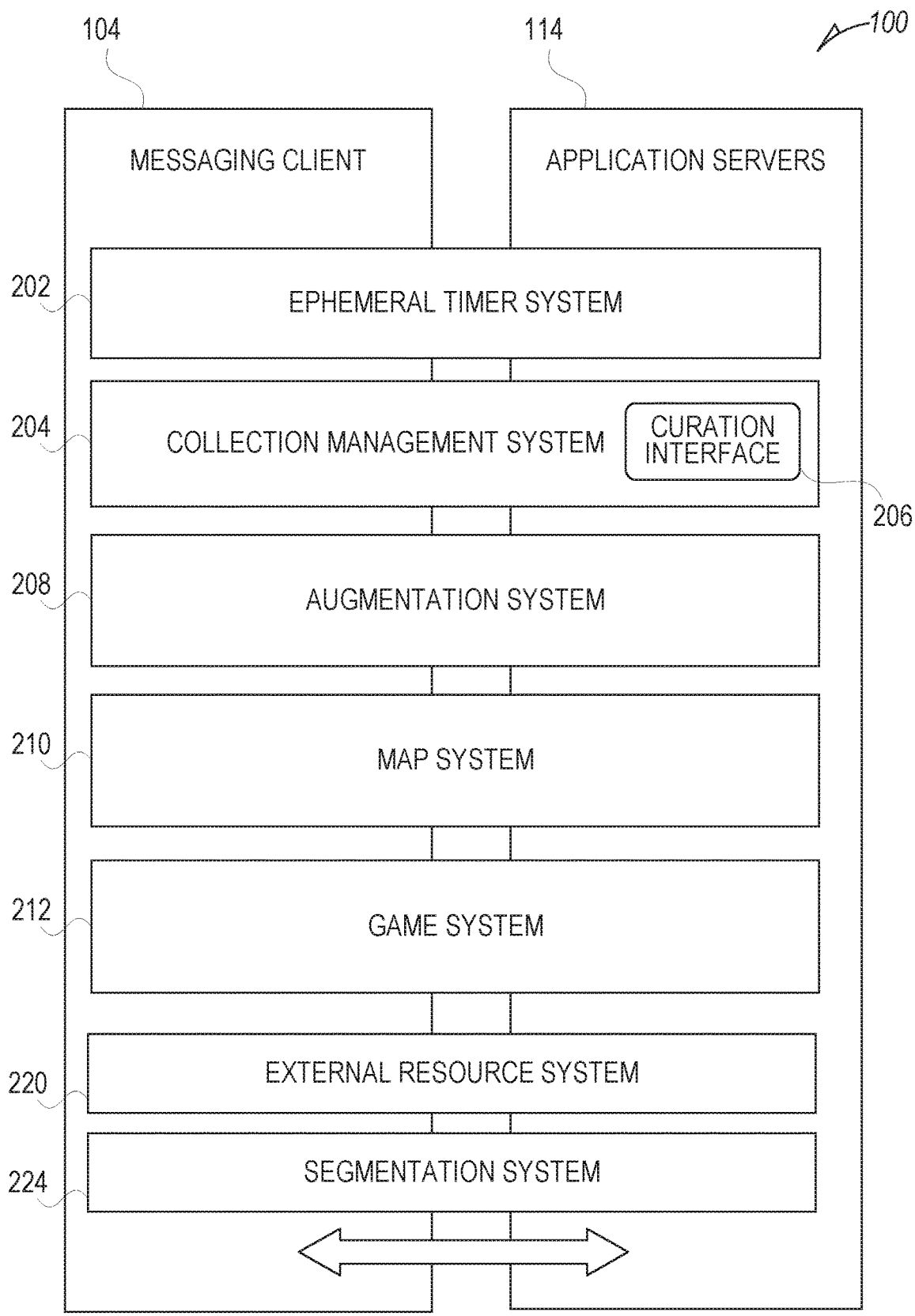
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
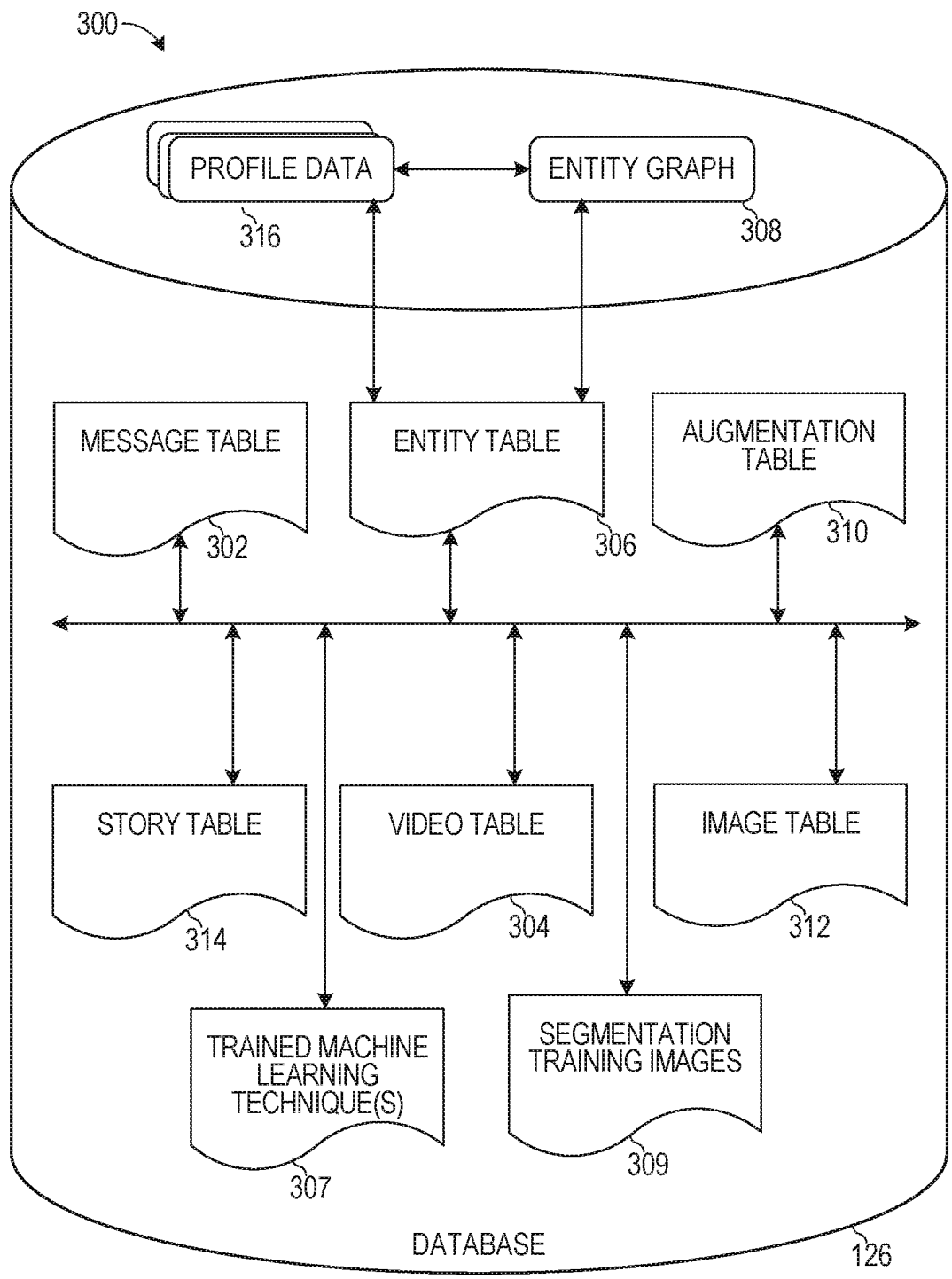
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or apples) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present to a user one or more AR experiences that can be controlled and presented on or in relation to a real-world object (e.g., an article of clothing, such as a shirt (fashion item or upper garment), worn by a person (or user)) depicted in the image. As an example, the messaging client 104 can detect a person in an image or video captured by the client device 102. The messaging client 104 can segment the real-world object depicted in the image or video, such as using a first machine learning technique (e.g., a segmentation network) and a second machine learning technique (e.g., a propagation network).

In response to segmenting the real-world object, the messaging client 104 can extract or process an image portion corresponding to the segmented object to provide one or more AR experiences. This enables the messaging client 104 to present one or more AR elements on or in relation to the real-world object depicted in the image, such as changing pixel values to change a color of the object, remove the object from the image, add a new virtual object in place of the real-world object, and/or generate a sticker or graphical element that includes an image portion that depicts the real-world object.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story," Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112, The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102, The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In some examples, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104, In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A segmentation system 224 segments an object depicted in an image (or video) or multiple objects depicted in an image (or video). An illustrative implementation of the segmentation system 224 is shown and described in connection with FIG. 5 below.

Specifically, the segmentation system 224 is a component that can be accessed by an AR/VR application implemented on the client device 102. The AR/VR application uses an RGB camera to capture a monocular image of a real-world environment in which one or more real-world objects are depicted. The AR/VR application applies various trained machine learning techniques on the captured image of the real-world environment in the image and one or more AR visual effects to the captured image. Segmenting the real-world objects results in an outline of the borders of the objects that appear in the image or video. Pixels within the borders of the segmented object correspond to the real-world object. The segmented object is used to distinguish one real-world object from other objects or elements depicted in the image and the background of the image which can be separately segmented and tracked. In some implementations, the AR/VR application continuously captures images of the real-world environment in real time or periodically to continuously or periodically update the applied one or more visual effects. This allows the user to move around in the real world and see the one or more visual effects update in real time.

In order for the AR/VR application to apply the one or more visual effects directly from a captured RGB image, the AR/VR application obtains a trained machine learning technique from the segmentation system 224. The trained machine learning technique processes the captured RGB image together with one or more segmentation datasets including corrections (positive clicks (correction) or negative clicks (correction)) to previously generated segmentations to estimate a segmentation that corresponds to the real-world object depicted in the captured RGB image. As referred to herein, a positive click or correction represents an indication of a pixel or region of the image that includes one or more pixels of the real-world object of interest and a negative click or correction represents an indication of a pixel or region of the image that excludes one or more pixels of the real-world object of interest, such as the background or another object.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104 based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 12 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images), This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102, The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation, Once a modification icon is selected, the transformation system initiates a process to convert the image of the user to reflect the selected modification icon (e.g., generate a smiling face on the user). A modified image or video stream may be presented in a GUI displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface), In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306, The entity table 306 may associate various augmentations from the augmentation table 310 with various images and videos stored in the image table 312 and the video table 304.

Trained machine learning technique(s) 307 stores parameters that have been trained during training of the segmentation system 224. For example, trained machine learning techniques 307 stores the trained parameters of one or more neural network machine learning techniques, such as a segmentation network and/or a propagation network. The segmentation network includes one or more machine learning techniques that are configured to estimate a segmentation of an object based on segmentation data and an image, where the segmentation data includes a previously generated segmentation or initial segmentation together with one or more corrections to the previously generated segmentation (e.g., positive and/or negative corrections). The propagation network includes one or more machine learning techniques that are configured to receive a segmentation of an object (e.g., from the segmentation network) and a new image (e.g., a subsequent frame in a video) and is configured to estimate a new segmentation of the object that is depicted in the new image. The propagation network continuously refines the segmentation by reprocessing another new image (e.g., one or more additional subsequent frames of the video) together with the immediately previous segmentation estimated by the propagation network for the previous new image.

Segmentation training images 309 stores a plurality of images or videos that each depict one or more real-world objects in real-world environments. The plurality of images stored in the segmentation training images 309 include segmentations of the objects that indicate which pixels in the images or videos correspond to the objects and which pixels correspond to a background or other objects in the images. Namely the segmentations provide the borders of the objects depicted in the images. These segmentation training images 309 are used by the segmentation system 224 to train the machine learning technique used to generate a segmentation of one or more objects depicted in a received RGB monocular image or video.

Data Communications Architecture

Figure 4:
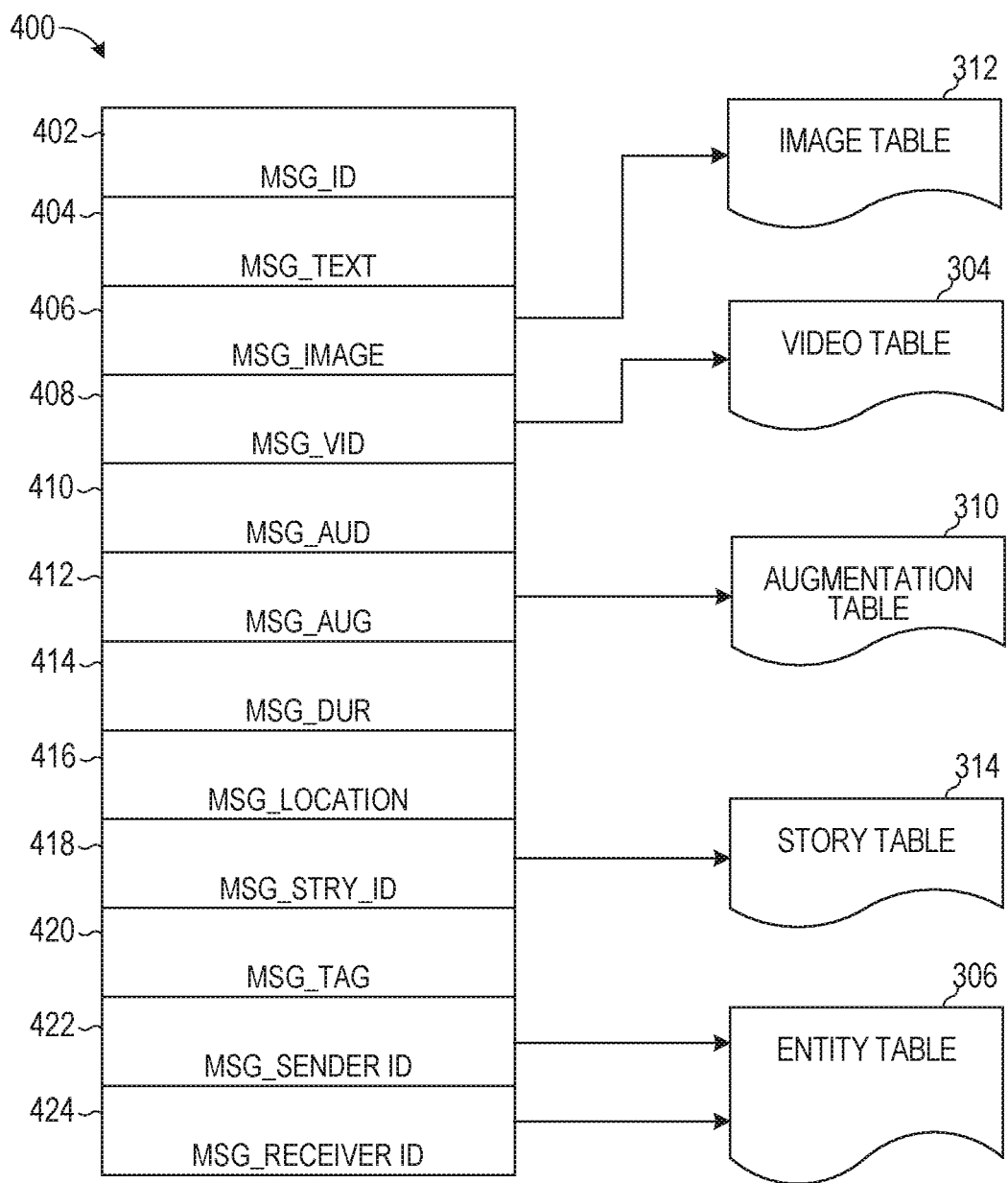
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Segmentation System

Figure 5:
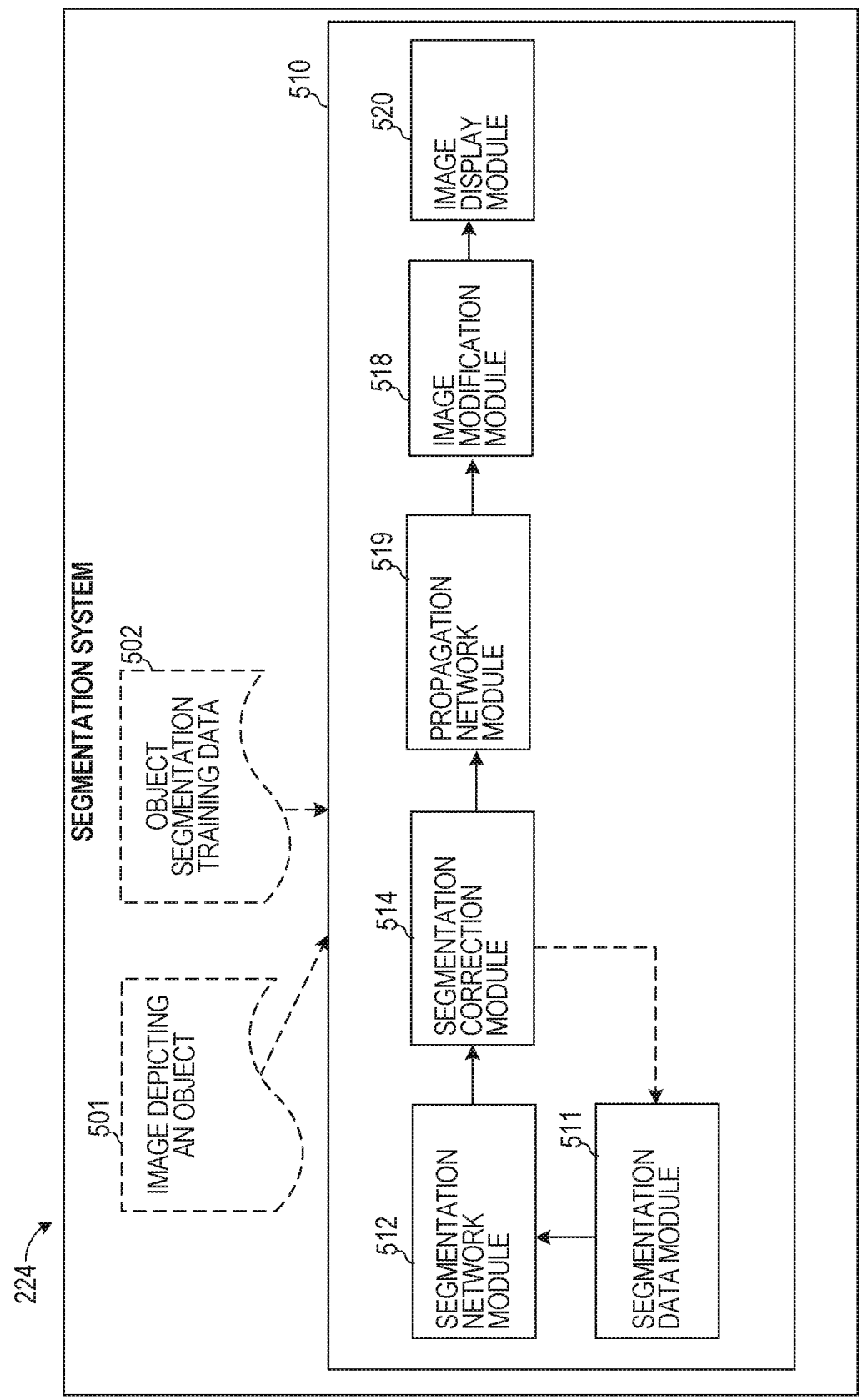
FIG. 5 is a block diagram showing an example segmentation system, according to some examples.

FIG. 5 is a block diagram showing an example segmentation system 224, according to some examples. The segmentation system 224 includes a set of components 510 that operate on a set of input data (e.g., a monocular image 501 depicting an object in a real-world environment and object segmentation training data 502). The set of input data is obtained from segmentation training images 309 stored in database(s) (FIG. 3) during the training phases and is obtained from an RGB camera of a client device 102 when an AR/VR application is being used, such as by a messaging client 104. The segmentation system 224 includes a segmentation network module 512 (e.g., a first machine learning technique), a segmentation data module 511 (or segmentation dataset module), a segmentation correction module 514, a propagation network module 519, an image modification module 518, and an image display module 520.

During training, the segmentation system 224 receives a given training image or video (e.g., monocular image 501 depicting a real-world object) from object segmentation training image data 502. The segmentation system 224 applies one or more machine learning techniques using the segmentation network module 512 on a first frame of the given training image or video. The segmentation network module 512 also receives a first segmentation dataset from the segmentation data module 511, The first segmentation dataset includes an initial segmentation of the real-world object depicted in the first frame and one or more positive and/or negative corrections to the initial segmentation. The segmentation network module 512 applies the first segmentation dataset to the first frame to estimate a segmentation of the real-world object depicted in the first frame. The estimated segmentation output by the segmentation network module 512 identifies the object mask (or borders) of the real-world object depicted in the first frame of the given training image or video.

The segmentation network module 512 retrieves ground-truth segmentation of the real-world object depicted in the first frame of the given training image or video from the object segmentation training data 502. The segmentation network module 512 compares the estimated segmentation with the ground truth segmentation. Based on a difference threshold or deviation of the comparison, the segmentation network module 512 updates one or more coefficients or parameters of the segmentation network module 512. The segmentation correction module 514 can determine whether the difference threshold or deviation of the comparison satisfies a stopping criterion. In response to determining that the difference threshold or deviation of the comparison fails to satisfy the stopping criterion, the segmentation correction module 514 processes the estimated segmentation and the first frame to generate one or more additional positive/negative corrections to the segmentation. In some examples, the segmentation correction module 514 is only used during training to simulate user behavior in providing positive and/or negative clicks. For example, the segmentation correction module 514 can use the ground-truth segmentation to sample randomly one or more pixels of the first frame that are outside of the ground-truth segmentation to generate one or more negative corrections and/or to sample randomly one or more pixels of the first frame that are inside or within the ground-truth segmentation to generate one or more positive corrections.

The segmentation correction module 514 communicates the estimated segmentation and the additional positive and/or negative corrections to the segmentation data module 511, The segmentation data module 511 combines the additional positive and/or negative corrections with a previous set of positive and/or negative corrections together with the estimated segmentation to generate a second segmentation dataset. The segmentation data module 511 once again provides the second segmentation dataset to the segmentation network module 512 to cause the segmentation network module 512 to generate a second estimated segmentation for the same first frame. The segmentation network module 512 applies the second segmentation dataset to the first frame to estimate the second segmentation of the real-world object depicted in the first frame. The second estimated segmentation output by the segmentation network module 512 identifies borders of the real-world object depicted in the first frame of the given training image or video.

The segmentation network module 512 retrieves the ground-truth segmentation of the real-world object depicted in the first frame of the given training image or video from the object segmentation training data 502. The segmentation network module 512 compares the second estimated segmentation with the ground truth segmentation. Based on a difference threshold or deviation of the comparison, the segmentation network module 512 updates one or more coefficients or parameters of the segmentation network module 512. The segmentation correction module 514 can determine whether the difference threshold or deviation of the comparison satisfies a stopping criterion. In response to determining that the difference threshold or deviation of the comparison satisfies the stopping criterion or after a specified number of epochs or batches of training images have been processed and/or when the difference threshold or deviation reaches a specified value, the segmentation correction module 514 completes training and the parameters and coefficients of the segmentation network module 512 are stored in the trained machine learning technique(s) 307 (e.g., as the first machine learning technique). In this way, the clicks correction occurs iteratively to regenerate and refine the object segmentation until a stopping criterion is reached.

The second estimated segmentation generated by the segmentation network module 512 and the given training video are then provided to the propagation network module 519 to train the propagation network module 519. The propagation network module 519 obtains a second frame of the given training video that is adjacent to and subsequent to the first frame of the given training video. The propagation network module 519 processes the second estimated segmentation of the real-world object together with the second frame to generate or estimate a third segmentation of the real-world object. The third segmentation can represent an adjusted version of the second estimated segmentation based on how a depiction of the real-world object moves in the second frame relative to the first frame. Namely, the third estimated segmentation is modified to represent changes in positioning of the real-world object over several frames of the given training video. In this way, the third segmentation represents a segmentation of the object that is depicted in the second frame while the second estimated segmentation represents a segmentation of the object depicted in the first frame.

In some examples, during training the propagation network module 519 operates on a separate set of training data than the segmentation network module 512 and is not connected to the output of the segmentation network module 512. In such cases, the propagation network module 519 retrieves a first training segmentation of an object depicted in a first training frame of a training video and accesses a second training frame of the training video. The propagation network module 519 processes the first training segmentation of the real-world object together with the second training frame to generate or estimate a new segmentation of the real-world object that represents changes in positioning of the real-world object from the first training frame to the second training frame.

The propagation network module 519 retrieves ground-truth segmentation of the real-world object depicted in the second frame of the given training video (or the ground-truth segmentation of the object depicted in the second training frame) from the object segmentation training data 502. The segmentation network module 512 compares the third estimated segmentation (or the new segmentation generated based on the second training frame and the first training segmentation) with the ground truth segmentation. Based on a difference threshold or deviation of the comparison, the propagation network module 519 updates one or more coefficients or parameters of the propagation network module 519. The propagation network module 519 can determine whether the difference threshold or deviation of the comparison satisfies a stopping criterion. In response to determining that the difference threshold or deviation of the comparison fails to satisfy the stopping criterion, the propagation network module 519 processes the third estimated segmentation and a third frame (that is subsequent and adjacent to the second frame) to generate a fourth segmentation or additional segmentations. Once the stopping criterion is reached, the propagation network module 519 completes training and is connected to the output of the segmentation network module 512.

The propagation network module 519 retrieves the ground-truth segmentation of the real-world object depicted in the third frame of the given training video from the object segmentation training data 502. The propagation network module 519 compares the fourth estimated segmentation with the ground truth segmentation. Based on a difference threshold or deviation of the comparison, the propagation network module 519 updates one or more coefficients or parameters of the propagation network module 519. The propagation network module 519 can determine whether the difference threshold or deviation of the comparison satisfies a stopping criterion. In response to determining that the difference threshold or deviation of the comparison satisfies the stopping criterion or after a specified number of epochs or batches of training images have been processed and/or when the difference threshold or deviation reaches a specified value, the propagation network module 519 completes training and the parameters and coefficients of the propagation network module 519 are stored in the trained machine learning technique(s) 307 (e.g., as the second machine learning technique).

The segmentation network module 512 and the propagation network module 519 continue to be trained using additional training images/videos in a similar manner, such as in an end-to-end manner. The process of training these networks repeats and continues until a convergence or stopping criterion is reached. In some examples the segmentation network module 512 and the propagation network module 519 are trained separately and only after they are each trained, the output of the segmentation network module 512 is provided as input to the propagation network module 519 during inference.

After training, segmentation system 224 receives an input image 501 (e.g., monocular image depicting a real-world object in a real-world environment) as a single RGB image and/or video from a client device 102. The segmentation system 224 applies the trained segmentation network module 512 to the received input image 501 together with inputs received from a user specifying positive/negative corrections to estimated segmentations of the real-world object to generate a segmentation of the real-world object depicted in the image 501. This segmentation is provided to the propagation network module 519 to update the segmentation of the real-world object to track movement of the real-world object throughout multiple frames of a video received after the estimated segmentation is generated.

Figure 6:
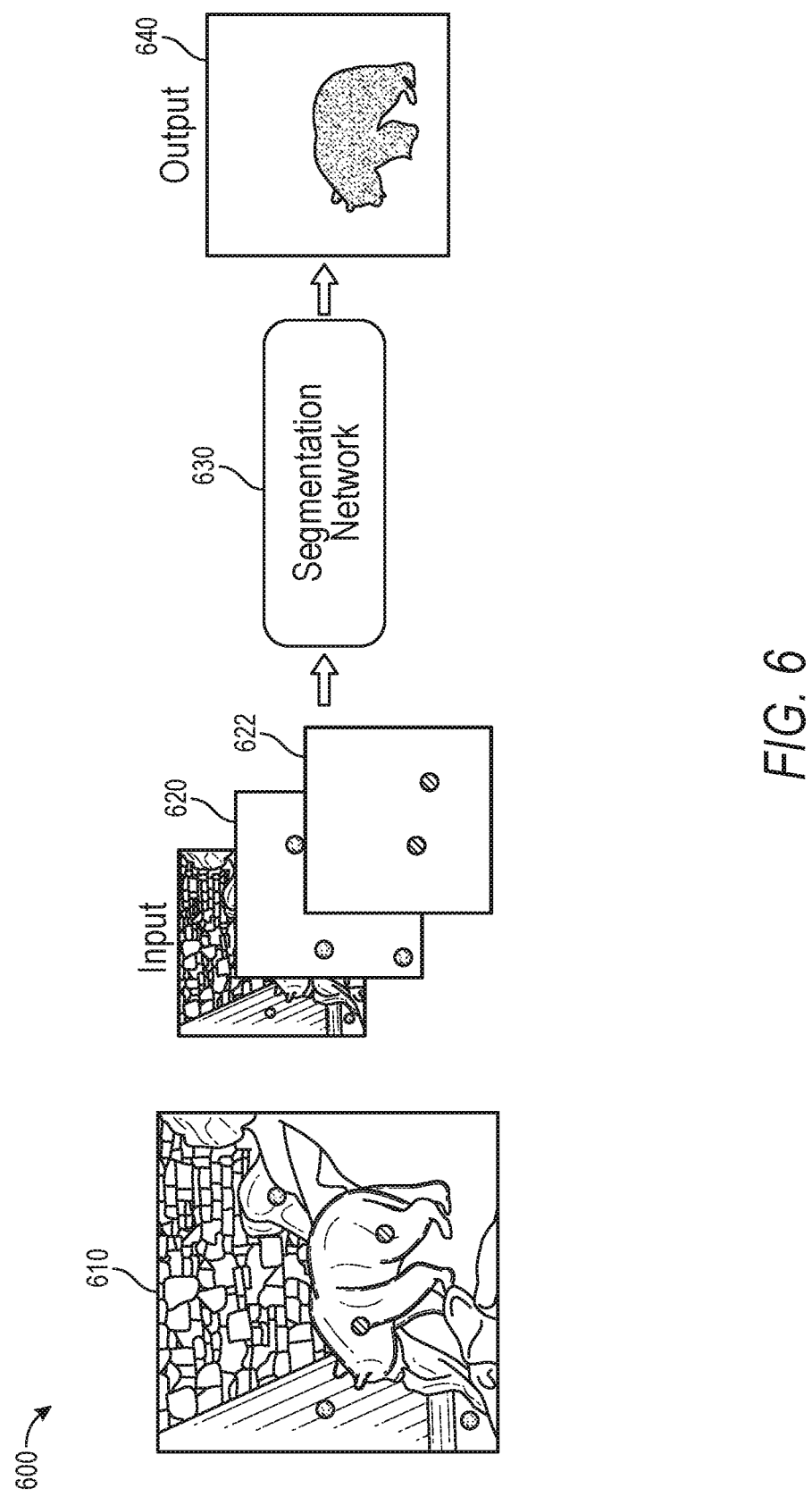
FIGS. 6, 7, and 8 are diagrammatic representations of outputs of the segmentation system, in accordance with some examples.

FIG. 6 is a diagrammatic representation of outputs of the segmentation system 224, in accordance with some examples. Specifically, FIG. 6 shows an implementation 600 of the segmentation network module 512. As shown in FIG. 6, an image 610 (e.g., a first frame of a video) can be received from a camera of a client device 102, such as from a front-facing or rear-facing camera of a client device 102. The image 610 can include a depiction of a real-world environment. The segmentation system 224 can detect multiple real-world objects in the image and can present visual indicators (e.g., dots) in the center of (or in relation to) each detected object.

The segmentation system 224 can receive input from a user that selects a given visual indicator in the image 610. In response, the segmentation system 224 can activate the segmentation network module 512 to perform a segmentation of the real-world object corresponding to the visual indicator that has been selected. The segmentation network module 512 can receive input from the user that specifies one or more positive and/or negative corrections. Namely, the input can provide positive corrections on the image 610 representing portions of the image 610 that include a depiction of the real-world object. The positive corrections can be received in response to a first type of user interaction, such as by tapping the portion of the image 610 with a single finger to indicate a positive correction. The input can also provide negative corrections on the image 610 representing portions of the image 610 that exclude a depiction of the real-world object. The negative corrections can be received in response to a second type of user interaction, such as by tapping the portion of the image 610 with a two fingers. It is to be understood that the user interaction can be performed in other manners and that tapping the portion of the image is just one example.

The segmentation system 224 can generate a first segmentation dataset based on the positive/negative corrections received from the user. The first segmentation dataset can include a first component 620 that represents the regions of the image 610 which were identified by the positive corrections (e.g., in a first color, such as red). The first segmentation dataset can include a second component 622 that represents the regions of the image 610 which were identified by the negative corrections (e.g., in a second color, such as blue). The first segmentation dataset can be provided together with an initial segmentation of the real-world object to the segmentation network 630 (e.g., the first machine learning technique implementing a first neural network).

The segmentation network 630 can process the first segmentation dataset, the image 610 and the initial segmentation of the real-world object to estimate or predict a first estimated segmentation 640 of the real-world object. The segmentation network 630 can present the first estimated segmentation 640 to the user on the client device 102. The user can specify whether a stopping criterion has been met, such as a deviation being within a certain threshold or a specified number of iterations has been reached. The segmentation network 630 can determine whether the stopping criterion has been met in response to receiving input from the user indicating that the estimated segmentation 640 accurately captures and represents the real-world object. In some cases, the segmentation system 224 can receive additional positive/negative corrections from the client device 102. For example, the segmentation system 224 can receive input from the user specifying one or more additional regions of the image 610 as including a depiction of the real-world object and/or specifying one or more additional regions of the image 610 as excluding a depiction of the real-world object.

Namely, the user can determine that the segmentation fails to include a head portion of the real-world object and in response, the segmentation system 224 receives input from the user that identifies a region of the image 610 where the head portion of the real-world object is depicted as including the real-world object. In some examples, the segmentation can be overlaid onto the image 610 and presented to the user. Portions of the image on which the segmentation is overlaid can be displayed in a different color from the underlying color of the image 610 to allow the user to visually distinguish the portions of the image corresponding to the segmentation from those that do not correspond to the segmentation. This allows the user to easily identify portions of the real-world object that are not being captured by the estimated segmentation and portions of the image that are captured by the estimated segmentation and should not be included. In this way, the user can select (e.g., by tapping with one finger) on one or more regions of the image that depict the real-world object and that are not included in the estimated segmentation to generate one or more additional positive corrections. The user can select (e.g., by tapping with two fingers simultaneously) on one or more regions of the image 610 that depict other objects or a background and that are (or are not) included in the estimated segmentation to generate one or more additional negative corrections.

The segmentation system 224 can add the identified region(s) to the first component 620 that represents the regions of the image 610 which were identified by the positive corrections. Similarly, the segmentation system 224 receive input from the user that identifies a region of the image 610 where the real-world object is not depicted. The segmentation system 224 can add the identified region(s) to the second component 622 that represents the regions of the image 610 which were identified by the negative corrections. The segmentation system 224 can generate a second segmentation dataset that includes the updated first and second components 620 and 622 and the first estimated segmentation 640.

The segmentation network 630 can process the second segmentation dataset, the image 610, and the first estimated segmentation 640 of the real-world object to estimate or predict a second estimated segmentation 640 of the real-world object. The segmentation network 630 can present the second estimated segmentation 640 to the user on the client device 102. The user can specify whether a stopping criterion has been met, such as indicating that no additional corrections are provided. In response to determining that no additional corrections have been received from the client device 102, the segmentation network 630 outputs the second estimated segmentation 640 to the propagation network module 519 to begin tracking the real-world object based on the second estimated segmentation 640 in a video feed depicting the real-world object.

Figure 7:
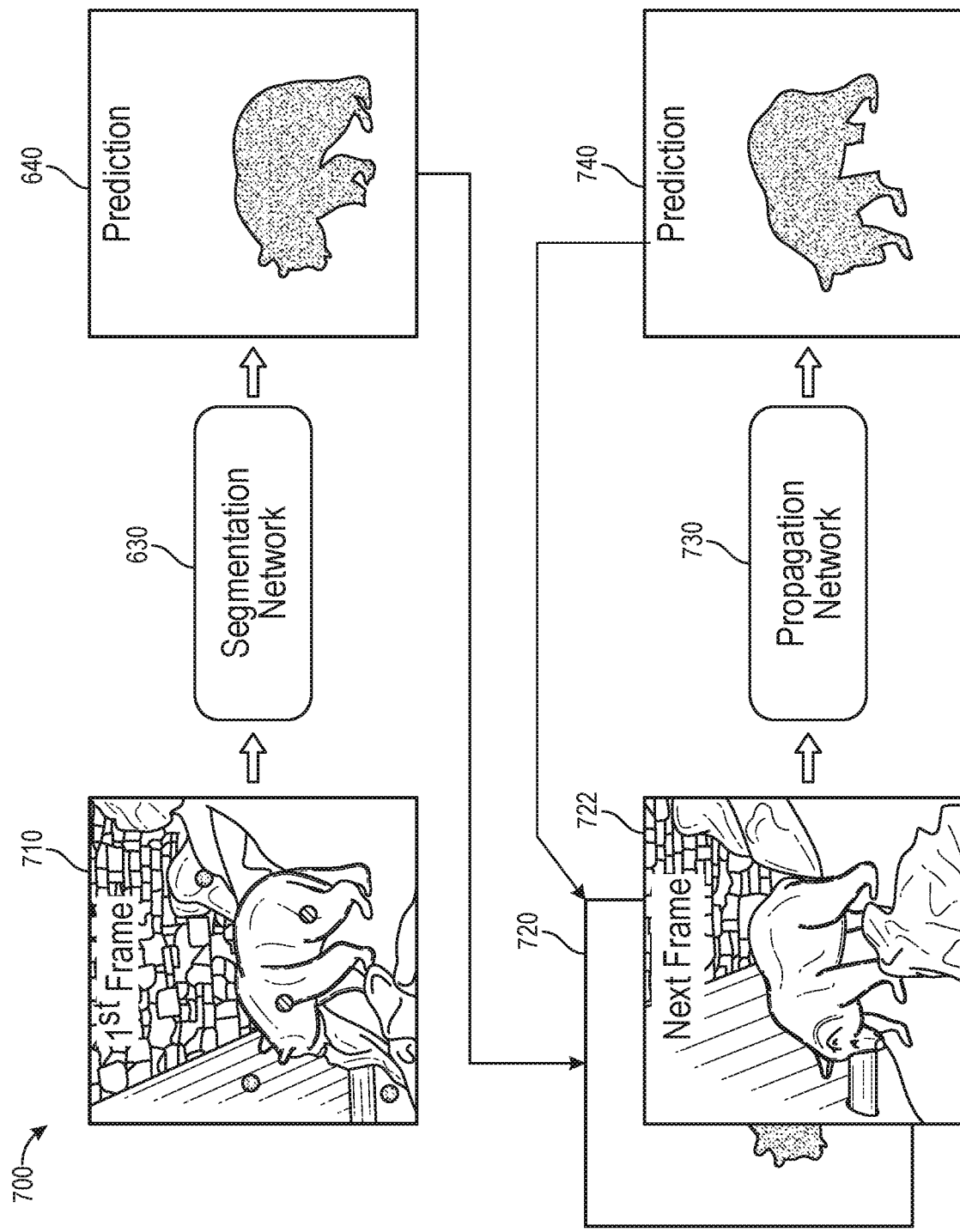

FIG. 7 is a diagrammatic representation of outputs of the segmentation system 224, in accordance with some examples. Specifically, FIG. 7 shows an implementation 700 of the propagation network module 519. As shown in FIG. 7, the first frame 710 of a video can be received, such as from a front-facing or rear-facing camera of a client device 102. The first frame 710 can include a depiction of a real-world environment. As discussed above in connection with FIG. 6, the segmentation network 630 generates an estimated or predicted segmentation of the real-world object depicted in the first frame 710 and outputs the predicted segmentation as the second estimated segmentation 640. The segmentation network 630 generates the predicted segmentation by receiving positive and/or negative corrections (identifying points, pixels, or regions of the first frame 710 that include a depiction of the real-world object and/or exclude the depiction of the real-world object) and processing the first frame 710 based on an initial segmentation (e.g., a completely black or green image) of the object and the positive/negative corrections.

The predicted segmentation 720 of the real-world object depicted in the first frame 710 is provided together with a second frame 722 of the video to a propagation network 730. The propagation network 730 processes the predicted segmentation 720 of the real-world object received from the segmentation network 630 together with the second frame to generate or estimate a third segmentation 740 of the real-world object that is depicted in the second frame. The third segmentation 740 can represent an adjusted version of the predicted segmentation based on how a depiction of the real-world object moves in the second frame 722 relative to the first frame 710. This third segmentation 740 is used to track and generate an AR experience with respect to the second frame 722 or subsequent frames of a video received or captured by the client device 102.

In some examples, in response to receiving a third frame (not shown) subsequent to the second frame 722, the propagation network 730 processes the third segmentation 740 of the real-world object previously generated by the propagation network 730 together with the third frame to generate or estimate a fourth segmentation 740 of the real-world object. The fourth segmentation 740 can represent an adjusted version of the third segmentation 740 based on how a depiction of the real-world object moves in the third frame relative to the second frame 722. Namely, the propagation network 730 initially operates on an estimated segmentation received from the segmentation network 630 in response to receiving a second frame following a first frame used by the segmentation network 630 to generate the estimated segmentation. Then, the propagation network 730 switches to operating on the updated segmentation generated by the propagation network 730 after receiving a third frame subsequent to the second frame.

In some examples, the propagation network 730 determines whether an updated segmentation has previously been generated by the propagation network 730 for a given video or within a threshold period of time (e.g., 3 second or less). In response to determining that the updated segmentation has not been previously generated by the propagation network 730, the propagation network 730 communicates with the segmentation network 630 to obtain a segmentation of a real-world object depicted in an initial frame of the given video. In response to determining that the updated segmentation has been previously generated by the propagation network 730 for the given video or within the threshold period of time, the propagation network 730 obtains the segmentation of a real-world object previously generated by the propagation network 730 to generate an updated segmentation for the object depicted subsequent frames of the video.

Figure 8:
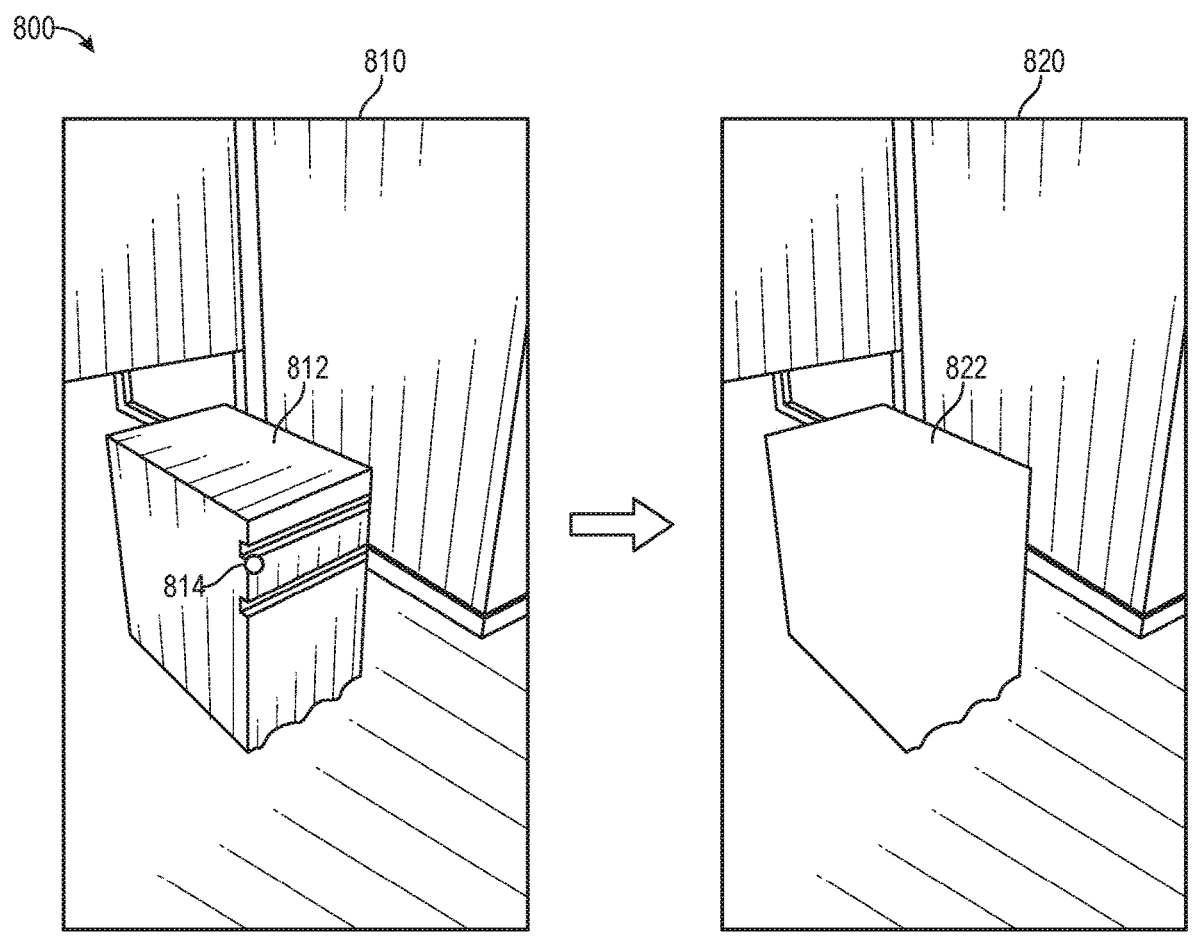

FIG. 8 shows illustrative outputs of one or more of visual effects 800 or AR experiences that can be selected and applied by the image modification module 518 based on the segmentation estimated by the segmentation network module 512 and/or the propagation network module 519. For example, as shown in FIG. 8, an image 810 can be received from a camera of a client device 102. The image 810 depicts a plurality of real-world objects including a real-world object 812.

The segmentation system 224 identifies the plurality of real-world objects and displays a visual indicator 814 for each identified real-world object (e.g., in the center of the detected real-world object). In some examples, the segmentation network 224 provides the visual indicator 814 for any object selected by the user or for which positive/negative clicks are received in the image. The segmentation system 224 receives input from the user selecting the visual indicator 814 (e.g., a region encompassing a dot or circle in the center of the object) of the real-world object 812. In response, the segmentation system 224 estimates a segmentation of the real-world object 812 using the first and second machine learning techniques, discussed above. For example, the segmentation system 224 can receive input from the user specifying portions of the image 810 that include a depiction of the real-world object 812 and portions that exclude the real-world object 812. Based on the input and an initial or estimated segmentation, the segmentation system 224 processes the image 810 to generate the segmentation of the real-world object 812. The segmentation system 224 then receives a subsequent image (e.g., a second frame of a video) and applies the propagation network 730 to update the segmentation of the real-world object 812 depicted in a subsequent image 820.

The segmentation system 224 can receive input from the user selecting an AR experience (e.g., via a GUI that lists a plurality of AR experiences). In some examples, the AR experience can include removing a depiction of the real-world object 812 from subsequently received images. In such cases, the segmentation system 224 uses the segmentation of the real-world object 812 to remove the depiction of the real-world object 812 from the subsequent image 820. As shown, a region 822 in which the real-world object 812 was present in the image 810 now excludes the depiction of the real-world object 812. In some examples, the segmentation system 224 performs inpainting to reconstruct a background of the object in the portion of the subsequent image 820 from which the depiction of the object has been removed. In some cases, the segmentation system 224 can add one or more AR elements (e.g., virtual furniture items or virtual clothing) to the image after removing the depiction of the object from the image 820.

In some examples, the AR experience selected by the user can include modifying a visual attribute of the real-world object 812 depicted in the image 810 based on the estimated segmentation of the object 812. For example, colors of pixels of the real-world object 812 contained within the segmentation can be set to a different color selected by the user.

In some examples, the AR experience selected by the user can include generating a sticker of the real-world object 812 depicted in the image 820 based on the estimated segmentation of the object 812. In such cases, the segmentation system 224 can crop a portion of the image 810 corresponding to the estimated segmentation of the object 812. The segmentation system 224 can save the cropped portion of the image 810 to generate a new image that includes only the cropped portion. In some cases, the segmentation system 224 can send a message to a recipient via a communication session that includes the cropped portion. For example, the segmentation system 224 can present a list of previously cropped portions that can be used as stickers to augment an image or video (e.g., the stickers can be added as 2D or 3D graphical elements to an image or video) that can be shared with one or more other users. In some cases, a user selection of a sticker from the list can be received and the corresponding image of the sticker can be sent to another user in a message. In some cases, a bounding box can be generated for the real-world object 812 based on the estimated segmentation of the real-world object 812. The bounding box can be displayed on the image 810 to represent the real-world object 812.

Figure 9:
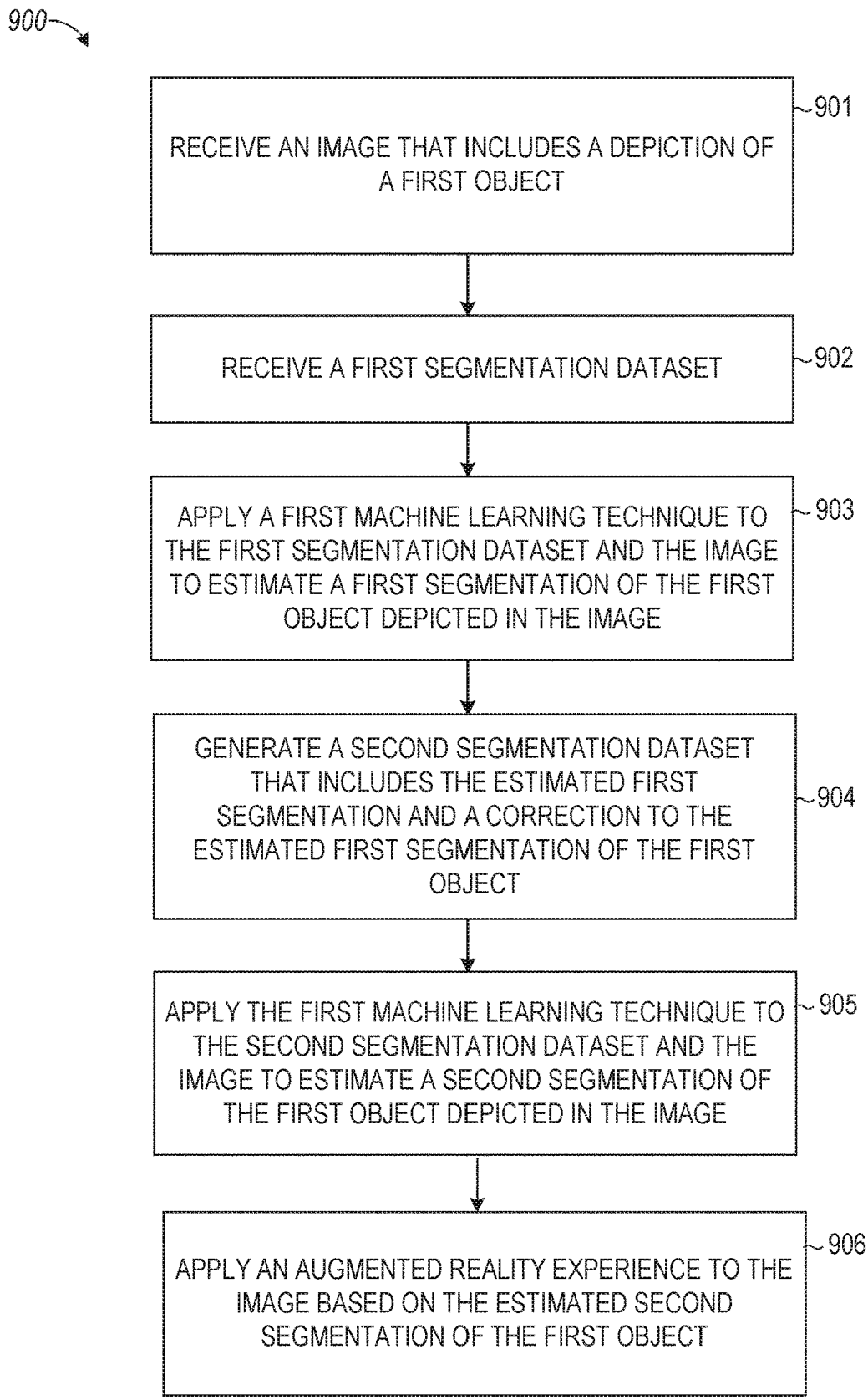
FIG. 9 is a flowchart illustrating example operations of the segmentation system, according to some examples.

FIG. 9 is a flowchart of a process 900 performed by the segmentation system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the segmentation system 224 (e.g., a client device 102 or a server) receives an image that includes a depiction of a first object, as discussed above.

At operation 902, the segmentation system 224 receives a first segmentation dataset, as discussed above. The first segmentation dataset can include a first set of positive and/or negative corrections specifying image points or regions that include depictions of an object of interest (the first object) and/or image points or regions that exclude depictions of the object of interest. The first segmentation dataset can also include an initial segmentation of the object of interest depicted in the image. For example, the first segmentation dataset can include the first and second components 620 and 622 of FIG. 6.

At operation 903, the segmentation system 224 applies a first machine learning technique to the first segmentation dataset and the image to estimate a first segmentation of the first object depicted in the image, as discussed above. For example, the segmentation network 630 can process the first and second components 620 and 622 along with the initial segmentation and the image to generate an estimated segmentation 640 of the object of interest.

At operation 904, the segmentation system 224 generates a second segmentation dataset that includes the estimated first segmentation and a correction to the estimated first segmentation of the first object, as discussed above. For example, the segmentation system 224 can receive additional positive and/or negative corrections and can update the first and second components 620 and 622 to include the additional points or regions of the image corresponding to the received additional positive and/or negative corrections. The updated first and second components 620 and 622 now include the previously included positive and negative corrections from the first segmentation dataset and the additional positive and negative corrections received after the estimated segmentation 640 is generated and presented to the user with the image 610 to receive the input specifying the additional positive/negative corrections.

At operation 905, the segmentation system 224 applies the first machine learning technique to the second segmentation dataset and the image to estimate a second segmentation of the first object depicted in the image, as discussed above.

At operation 906, the segmentation system 224 applies an AR experience to the image based on the estimated second segmentation of the first object, as discussed above. For example, the segmentation system 224 can modify visual attributes of the real-world object or remove the real-world object from the image based on the estimated segmentation 640.

Machine Architecture

Figure 10:
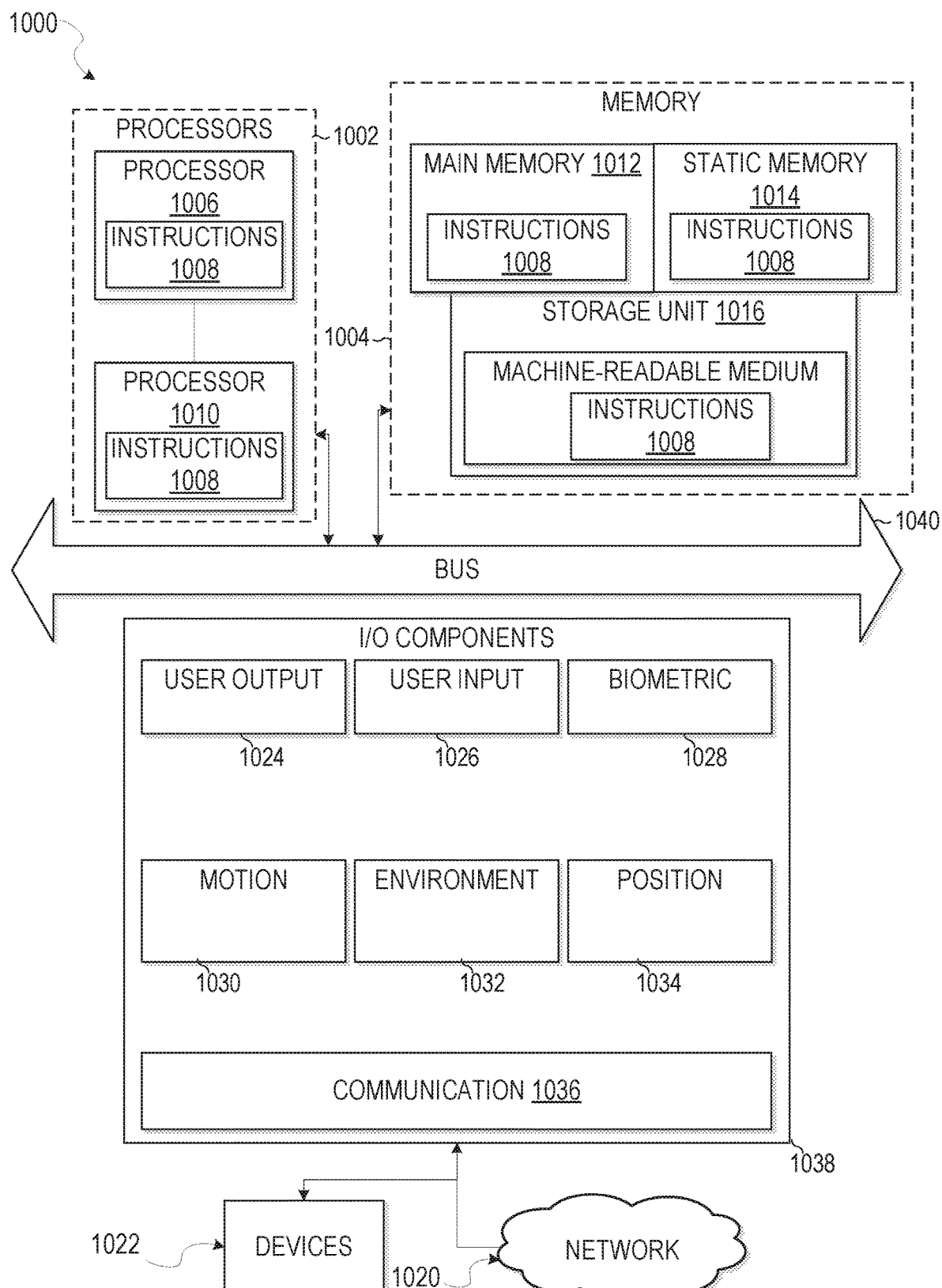
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise; but not be limited to, a server computer, a client computer, a PC, a tablet computer, a laptop computer, a netbook, a STB, a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a col lection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102, The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NEC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
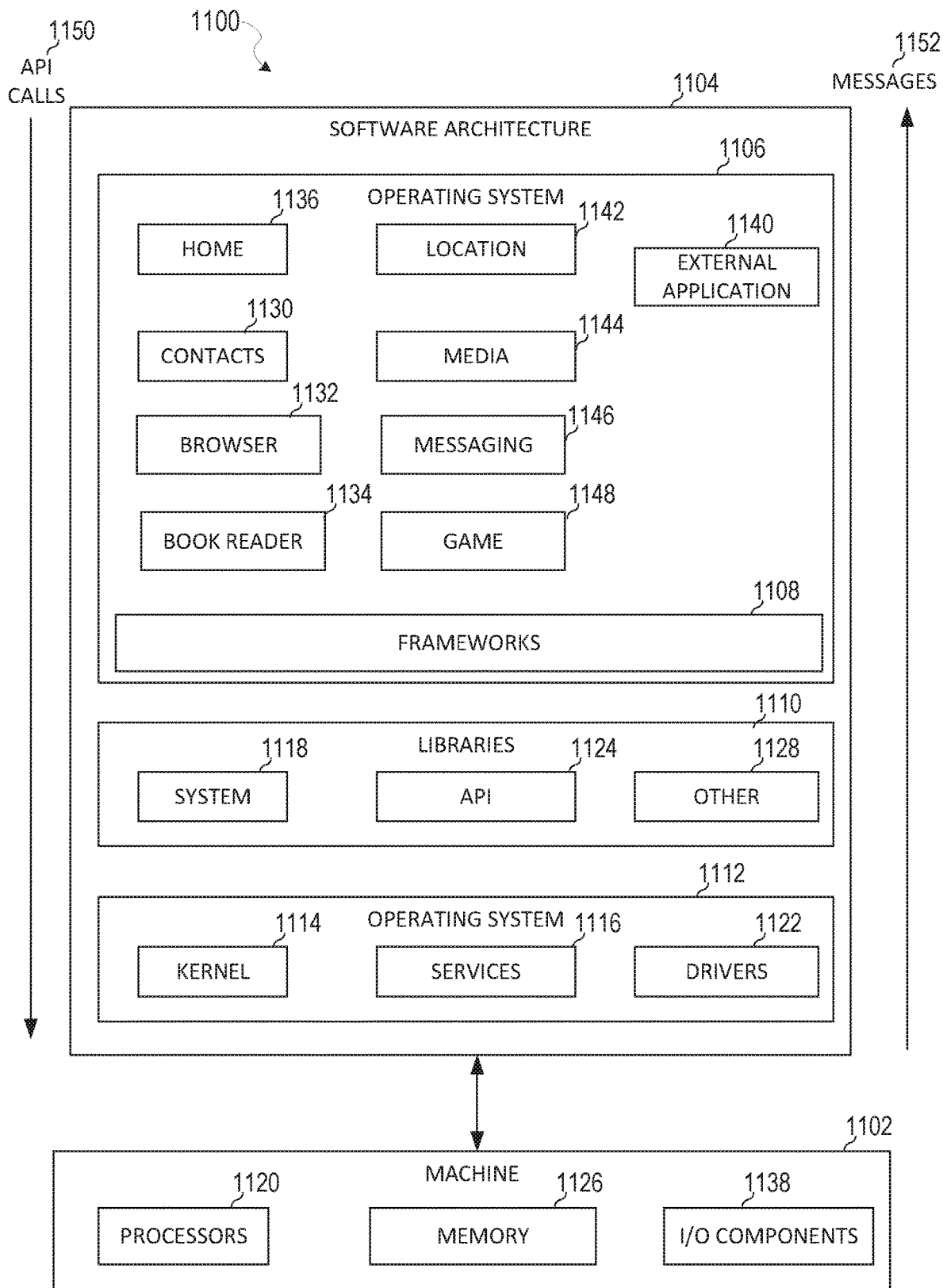
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various GUI functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example; the external application 1140 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1140 can invoke the API calls 1150 provided by the operating system H 12 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, STBs, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access, example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by one or more processors, an image that includes a depiction of a first object;
receiving a first segmentation dataset;
applying a first machine learning technique to the first segmentation dataset and the image to estimate a first segmentation of the first object depicted in the image;
presenting the first segmentation of the first object estimated by the first machine learning technique on a device;
receiving input that provides a correction to the first segmentation of the first object estimated by the first machine learning technique, the correction comprising positive and negative portions, the positive portion comprising one or more positive corrections representing a first portion of the image that includes the depiction of the first object, the negative portion comprising one or more negative corrections representing a second portion of the image that excludes the depiction of the first object;
generating a second segmentation dataset that includes the estimated first segmentation and the correction to the estimated first segmentation of the first object;
in response to receiving the input that provides the correction to the first segmentation of the first object estimated by the first machine learning technique, applying the first machine learning technique to the second segmentation dataset and the image to estimate a second segmentation of the first object depicted in the image, the first machine learning technique being applied using the second segmentation dataset to the same image for which the first segmentation of the first object was estimated by the first machine learning technique; and
applying an augmented reality experience to the image based on the estimated second segmentation of the first object.

2. The method of claim 1, further comprising:
detecting a plurality of objects depicted in the image;
causing a plurality of visual indicators to be displayed in relation to each of the plurality of objects; and
receiving input that selects a given visual indicator of the plurality of visual indicators.

3. The method of claim 2, wherein the first machine learning technique is applied to estimate the first segmentation of the first object in response to receiving the input that selects the given visual indicator.

4. The method of claim 1, further comprising:
generating the first segmentation dataset in response to receiving input comprising one or more identifiers of a region comprising the depiction of the first object.

5. The method of claim 1, wherein the input comprises the one or more positive corrections and the one or more negative corrections.

6. The method of claim 1, further comprising:
applying a second machine learning technique to a second image and the estimated second segmentation of the first object to estimate a third segmentation of the first object depicted in the second image, the second machine learning technique comprising a propagation network different from the first machine learning technique.

7. The method of claim 1, further comprising training the first machine learning technique by performing operations comprising:
receiving a first training dataset, the first training dataset comprising a first training image comprising a first training object and a ground-truth segmentation of the first training object;
randomly sampling object pixels from a first portion of the first training image that includes the first training object to generate first training segmentation data;
adding, to the first training segmentation data, identifiers of pixels of the first training image that exclude the first training object;
applying the first machine learning technique to the first training segmentation data and the first training image to estimate a training segmentation of the first training object depicted in the first training image;
computing a deviation between the training segmentation and the ground-truth segmentation of the first training object; and
updating one or more parameters of the first machine learning technique based on the deviation.

8. The method of claim 1, further comprising:
receiving a video comprising a plurality of frames, wherein the image comprises a first frame of the plurality of frames;
accessing a second frame of the plurality of frames that depicts the first object; and
applying a second machine learning technique to the second frame and the estimated second segmentation of the first object to estimate a third segmentation of the first object depicted in the second frame.

9. The method of claim 8, wherein the first machine learning technique comprises a segmentation network and the second machine learning technique comprises a propagation network.

10. The method of claim 8, further comprising training the second machine learning technique by performing operations comprising:
receiving a first training dataset, the first training dataset comprising a first training video comprising a first training object and a ground-truth segmentation of the first training object;
receiving a segmentation of the first training object generated based on a first training frame of the first training video;
applying the second machine learning technique to a second training frame and the segmentation of the first training object to estimate a training segmentation of the first object depicted in the second training frame;
computing a deviation between the training segmentation and the ground-truth segmentation of the first training object depicted in the second training frame; and
updating one or more parameters of the second machine learning technique based on the deviation.

11. The method of claim 10, wherein the segmentation of the first training object is generated by applying the first machine learning technique to the first training frame together with segmentation data generated using the first training frame.

12. The method of claim 1, wherein applying the augmented reality experience to the image comprises removing a depiction of the first object from the image based on the estimated second segmentation of the first object.

13. The method of claim 12, further comprising:
performing inpainting to reconstruct a background of the first object in a portion of the image from which the depiction of the first object has been removed; and
adding one or more augmented reality elements to the image after removing the depiction of the first object from the image.

14. The method of claim 1, wherein applying the augmented reality experience to the image comprises modifying a visual attribute of the first object depicted in the image based on the estimated second segmentation of the first object.

15. The method of claim 1, wherein applying the augmented reality experience to the image comprises:
cropping a portion of the image corresponding to the estimated second segmentation of the first object; and
saving the cropped portion of the image to generate a new image comprising the cropped portion or sending a message to a recipient comprising the cropped portion.

16. The method of claim 1, wherein applying the augmented reality experience to the image comprises generating a bounding box for the first object based on the estimated second segmentation of the first object.

17. The method of claim 1, further comprising causing the estimated first segmentation to be displayed on the device together with the image to generate the second segmentation dataset.

18. A system comprising:
at least one processor of a device; and
a memory component having instructions stored thereon that, when executed by the at least one processor, cause the at least one processor to perform operations comprising:
receiving an image that includes a depiction of a first object;
receiving a first segmentation dataset;
applying a first machine learning technique to the first segmentation dataset and the image to estimate a first segmentation of the first object depicted in the image;
presenting the first segmentation of the first object estimated by the machine learning technique on the device;
receiving input that provides a correction to the first segmentation of the first object estimated by the first machine learning technique, the correction comprising positive and negative portions, the positive portion comprising one or more positive corrections representing a first portion of the image that includes the depiction of the first object, the negative portion comprising one or more negative corrections representing a second portion of the image that excludes the depiction of the first object;
generating a second segmentation dataset that includes the estimated first segmentation and the correction to the estimated first segmentation of the first object;
in response to receiving the input that provides the correction to the first segmentation of the first object estimated by the machine learning technique, applying the first machine learning technique to the second segmentation dataset and the image to estimate a second segmentation of the first object depicted in the image, the first machine learning technique being applied using the second segmentation dataset to the same image for which the first segmentation of the first object was estimated by the first machine learning technique; and
applying an augmented reality experience to the image based on the estimated second segmentation of the first object.

19. The system of claim 18, further comprising operations for:
applying a second machine learning technique to a second image and the estimated second segmentation of the first object to estimate a third segmentation of the first object depicted in the second image, the second machine learning technique comprising a propagation network different from the first machine learning technique.

20. A non-transitory computer-readable storage medium having stored thereon instructions that, when executed by at least one processor of a device, cause the at least one processor to perform operations comprising:
receiving an image that includes a depiction of a first object;
receiving a first segmentation dataset;
applying a first machine learning technique to the first segmentation dataset and the image to estimate a first segmentation of the first object depicted in the image;
presenting the first segmentation of the first object estimated by the first machine learning technique on a device;
receiving input that provides a correction to the first segmentation of the first object estimated by the first machine learning technique, the correction comprising positive and negative portions, the positive portion comprising one or more positive corrections representing a first portion of the image that includes the depiction of the first object, the negative portion comprising one or more negative corrections representing a second portion of the image that excludes the depiction of the first object;
generating a second segmentation dataset that includes the estimated first segmentation and the correction to the estimated first segmentation of the first object;
in response to receiving the input that provides the correction to the first segmentation of the first object estimated by the first machine learning technique, applying the first machine learning technique to the second segmentation dataset and the image to estimate a second segmentation of the first object depicted in the image, the first machine learning technique being applied using the second segmentation dataset to the same image for which the first segmentation of the first object was estimated by the first machine learning technique; and
applying an augmented reality experience to the image based on the estimated second segmentation of the first object.

* * * * *